(12) United States Patent
Holmes et al.

(10) Patent No.: US 8,738,207 B2
(45) Date of Patent: May 27, 2014

(54) HYBRID VEHICLE WITH ELECTRIC TRANSMISSION AND ELECTRIC DRIVE MODULE

(75) Inventors: Alan G. Holmes, Clarkston, MI (US); Brendan M. Conlon, Rochester Hills, MI (US); Norman K. Bucknor, Troy, MI (US); Constantine Nick Raptis, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 166 days.

(21) Appl. No.: 13/459,541

(22) Filed: Apr. 30, 2012

(65) Prior Publication Data
US 2013/0289810 A1    Oct. 31, 2013

(51) Int. Cl.
*B60W 20/00* (2006.01)
*B60W 10/06* (2006.01)
*B60W 10/08* (2006.01)

(52) U.S. Cl.
CPC ............... *B60W 20/00* (2013.01); *B60W 10/08* (2013.01); *B60W 10/06* (2013.01); *Y10S 903/902* (2013.01)
USPC ...... 701/22; 477/3; 477/5; 477/101; 477/102; 477/103; 180/65.265; 903/902

(58) Field of Classification Search
CPC ...... B60W 20/00; B60W 10/06; B60W 10/08
USPC ............. 701/22; 477/3, 5, 101–105; 903/902; 180/65.265
See application file for complete search history.

(56) References Cited

U.S. PATENT DOCUMENTS

| | | | | |
|---|---|---|---|---|
| 8,083,016 | B2 * | 12/2011 | Naik et al. | 180/65.23 |
| 2007/0042851 | A1 * | 2/2007 | Gronych et al. | 474/237 |
| 2008/0182712 | A1 * | 7/2008 | Kira et al. | 477/7 |
| 2011/0098152 | A1 * | 4/2011 | Sah et al. | 477/86 |
| 2012/0130609 | A1 * | 5/2012 | Jess et al. | 701/54 |
| 2012/0265421 | A1 * | 10/2012 | Livshiz et al. | 701/102 |

FOREIGN PATENT DOCUMENTS

| | | |
|---|---|---|
| JP | 2008247265 A | 10/2008 |
| JP | 2011219039 A | 4/2011 |

OTHER PUBLICATIONS

Hidehiro Oba, Akihiro Yamanaka, Hiroshi Katsuta, Kensuke Kamichi, "Development of a Hybrid Powertrain System Using CVT in a Minivan", SAE Technical Paper Series, Mar. 2002, 2002-01-0991.

\* cited by examiner

*Primary Examiner* — Fadey Jabr
*Assistant Examiner* — Yazan A Soofi
(74) *Attorney, Agent, or Firm* — Quinn Law Group, PLLC

(57) ABSTRACT

A hybrid vehicle is provided with an electric transmission operatively connected to a first axle and an electric drive module operatively connected to a second axle. A transmission ratio of a differential gear set and a final drive of the electric transmission are selected so that a torque ratio of torque of the first axle over the torque of the engine is that at which any working chamber of the engine that is operated to expand the working fluid can operate without throttling, without torque of the engine torque exceeding a torque necessary to propel the vehicle at a steady vehicle speed, and with the second electric machine freewheeling.

20 Claims, 4 Drawing Sheets

HYBRID VEHICLE WITH ELECTRIC TRANSMISSION AND ELECTRIC DRIVE MODULE

TECHNICAL FIELD

The present teachings generally include a hybrid vehicle configured for efficient engine performance.

BACKGROUND

A vehicle may be equipped with one or more front wheels and one or more rear wheels. The vehicle may be equipped with an engine, producing shaft power to propel the vehicle. The vehicle may be equipped with a transmission for transforming shaft power from the output of an engine at relatively low torque and high speed into relatively high torque and low speed to drive one or more wheels. The vehicle may be equipped with axles for conveying shaft power from the transmission to one or more wheels. It may be advantageous, especially regarding mechanical simplicity, to drive only the front wheels or only the rear wheels using the engine, transmission, and axles. It may be advantageous, especially regarding operation in a variety of environmental conditions, to drive all of the wheels.

The force to propel a wheeled vehicle travelling at a steady speed across a level surface with no substantial wind may be represented mathematically using three terms related to the speed of the vehicle, commonly referred to as F0, F1 and F2. The force may be approximately the sum of the F0 term, the F1 term multiplied by the speed of the vehicle, and the F2 term multiplied by the square of the speed of the vehicle. The F0 term is related to dry friction, the F1 term is related to viscous friction, and the F2 term is related to aerodynamic drag. These terms are theoretically all greater than zero, and when found empirically are generally calculated, based on measurements, to be greater than zero. Thus, the force to propel the vehicle at a steady speed on a level surface with no wind is approximated by a parabolic function of that speed. The rotational torque required to drive the vehicle by traction of one or more of its wheels is therefore approximated by a parabolic function of the rotational speed of the wheels of the vehicle.

An engine producing shaft power may be capable of output across a range of rotational output speeds and across a range of output torque while burning fuel at a rate which is a predictable function of speed and torque. For example, a contemporary internal combustion reciprocating-piston or rotary-piston engine may be capable of running with acceptable smoothness and producing some amount of shaft torque output above an idle speed and may be capable of running without damage and producing some amount of shaft torque output up to a maximum engine speed. The amount of shaft torque output from the example engine may vary from a maximum value with its throttle wide open to zero with its throttle shut at a particular speed. The maximum shaft torque, commonly referred to as "the torque curve", may be similar in magnitude, that is relatively "flat", across a speed range that is a part of the overall speed range from idle speed to maximum engine speed.

The amount of shaft work produced for a given amount of fuel consumed, that is the efficiency of the engine in converting the potential of the fuel into shaft work, varies with operating torque and speed. The efficiency for an engine using spark-ignition and following the four-stroke cycles attributed to Otto or Atkinson is generally greatest with the throttle wide open, that is at maximum torque, and decreases to zero efficiency at zero output torque, provided that the ratio of fuel and air remains substantially the same, e.g. balanced, for all operating conditions. Enrichment of the mixture with extra fuel generally allows operating with output torque beyond the maximum that can be obtained with a balanced or lean mixture, but the efficiency of the engine is lowered by the use of this extra fuel. For a vehicle where fuel efficiency and clean exhaust are paramount, the engine generally will be controlled to operate with a substantially balanced or slightly lean mixture, for all torque levels and for all speeds except the combination of high torque and high speed which allows the engine to produce its maximum power and the speeds and torques approaching this combination.

A spark-ignition engine may be operated with alternative means of controlling or changing the torque instead of a throttle, which likewise decreases engine efficiency, though in lesser magnitude, when torque is reduced below its maximum. For instance, the engine may have cylinders equipped with intake valves, and the duration or timing of the opening or closing of these valves, or the distance of the opening of these valves, commonly referred to as "lift", may be varied to control or to restrict the amount of air or a mixture of air and fuel, admitted to each cylinder. Changing the timing of the intake valves, so that they remain open and allow some air or air-fuel mixture to escape from each cylinder after the intake stroke, that is late intake valve closing, may result in less loss of efficiency, because the piston is not required to pull the air or air-fuel through a restriction during the intake stroke. In general, however, reducing the amount of air admitted to a cylinder below a particular level will reduce the net expansion of the gases and therefore significantly reduce the efficiency of the engine.

A compression-ignition engine is generally controlled simply by varying the amount of fuel introduced into its cylinders or other working chambers. The compression ratio is high enough and the fuel properties are such that combustion of fuel takes place around individual fuel droplets when they are introduced into the cylinder following most of the compression stroke. Maintaining a favorable mixture of fuel and air throughout the chamber to propagate a flame across the chamber from a spark source of combustion is not necessary. Therefore, air need not be restricted from entering the engine by a throttle or other means, expansion ratio is maintained, and efficiency is relatively flat across a wide range of torque values at any given speed. To change or to control the torque output of the compression-ignition engine, the amount of fuel introduced into the cylinders may be varied between zero and a predetermined maximum amount of fuel that can be burned without visible or otherwise excessive smoke or other unburned fuel in the exhaust.

A transmission is generally provided in a wheeled vehicle as part of the operative connection from the engine to the wheels. Contemporary vehicles often have a transmission, sometimes referred to as a "transaxle", which includes one or more devices for selecting from multiple speed and torque ratios from the engine to the wheels, final drive gearing with a fixed ratio of speed and torque, and an axle differential which is connected to the wheels by the two halves of an axle. Such a transmission is included in a vehicle to transform the speed and torque output from the output shaft of the engine to a lesser speed and greater torque that is more suitable for turning the axle and wheels and thereby driving the vehicle. The transmission typically provides between four and eight different selectable ratios, each of which is a ratio of both the speed of the engine over the speed of the axle and the torque of the axle over the torque of the engine, not considering the drag or inertia of the transmission components. The different selectable ratios of both speed and torque are included to allow the vehicle to accelerate across a wide range of speeds and to cruise at any speed within that range above some minimum cruising speed which is customarily one third or less of the maximum cruising speed.

SUMMARY

A hybrid vehicle has a first axle and a second axle and includes an engine with at least one working chamber, such as a cylinder or a rotor, for expanding a working fluid. The vehicle has an electric transmission operatively connected to the first axle and an electric drive module operatively connected to the second axle. An electronic controller controls electric machines within the electric transmission and the electric drive module so that the torque and speed requirements of the vehicle are continuously met while maintaining engine operating efficiency and without requiring a "through the road" power loop in which one of the electric machines must create an axle torque that opposes desired forward propulsion.

Specifically, the hybrid vehicle includes an electric transmission that has a differential gear set with a first member, a second member, and a third member, such as but not limited to a simple planetary gear set. The electric transmission also has a first final drive and a first electric machine. The engine is connected for common rotation with the first member, the first electric machine is connected for common rotation with the second member, and the third member is operatively connectable with the first axle through the final drive, such as but not limited to by selective engagement of a first clutch. In one embodiment, the third member may be grounded to a stationary member by selective engagement of a first brake.

The electric drive module includes a second electric machine operatively connectable to the second axle through a second final drive. The differential gear set and the first final drive establish a fixed transmission torque ratio of torque of the first axle over torque of the engine when the first electric machine is producing sufficient reaction torque and the first clutch is engaged. The transmission torque ratio is fixed, changing only with relatively small drag losses, when the first clutch is engaged and the first electric machine is producing sufficient reaction torque (i.e., is not freewheeling, but is not necessarily stationary). The fixed transmission torque ratio is that at which the working chamber, or if there are multiple working chambers, those that are operated to expand the working fluid, operates without restriction, without the torque of the engine exceeding that torque that is necessary to propel the vehicle at a steady vehicle speed, and with the second electric machine freewheeling.

Drag losses in the differential gear set and the first final drive are typical in transmission gearing arrangements and are not considered by those skilled in the art as relevant to the categorization of a torque ratio as either fixed or variable. Likewise, the torque ratio does not include any effects from rotational inertia of various components, and the torque ratio is independent of changes in speed. The fixed torque ratio cannot be varied by and is not dependent on the speed or torque of the first electric machine.

The differential gear set and the first final drive also establish a particular speed relationship amongst the engine, the first electric machine, and the first axle when the first clutch is engaged. This speed relationship is a linear combination based on the action of the differential gear set, wherein the speed of one member is determined by the combination of the speeds of the other two members. Therefore, the transmission speed ratio of the speed of the engine over the speed of the first axle varies with the speed of the first electric machine, and reaches a particular, characteristic speed ratio with the first electric machine at zero speed.

The controller is configured to operate the first electric machine as a generator to provide a variable transmission speed ratio of the speed of the engine over the speed of the first axle, while the single fixed torque ratio of torque of the first axle over torque of the engine is maintained through the differential gear set and the first final drive. Electricity may be produced by the first electric machine to be used by the second electric machine, to be stored in a propulsion battery or other energy storage device, or to be fed to electrical accessories aboard the vehicle. The controller can be also configured to operate the second electric machine as a motor that uses power provided by the first electric machine, in a two axle-drive, input-split operating mode. Accordingly, although the ratio of the torque of the first axle over the torque of the engine is fixed, the ratio of the sum of the torque on the first axle and the torque on the second axle over the engine torque is a variable torque ratio for the hybrid powertrain as a whole, which will vary approximately with the transmission speed ratio in the absence of power to or from the energy storage device.

The above features and advantages and other features and advantages of the present teachings are readily apparent from the following detailed description of the best modes for carrying out the present teachings when taken in connection with the accompanying drawings.

DETAILED DESCRIPTION

Figure 1:
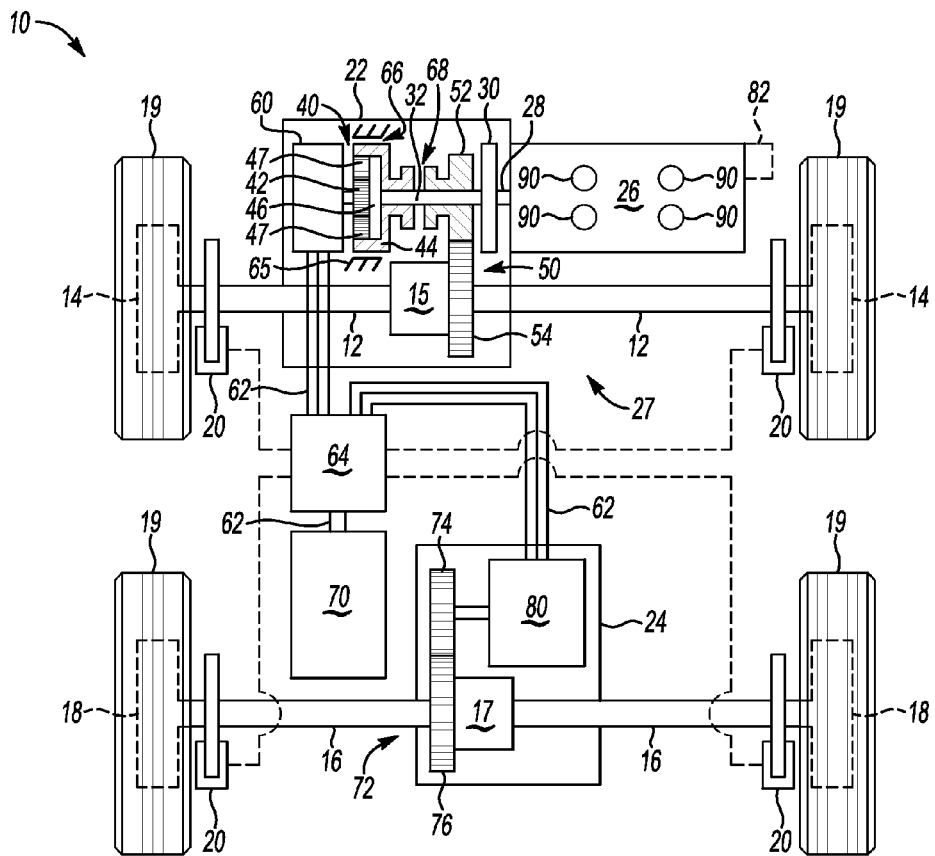
FIG. 1 is a schematic illustration in partial cross-sectional view of a hybrid electric powertrain installed in a vehicle, including an engine and an electric transmission unit with a hybrid electric transmission between the engine and the front axle, and a first motor-generator, and operatively connected to a first axle for driving the front wheels and a rear drive unit with a second motor-generator operatively connected to a second axle for driving the rear wheels.

Referring to the drawings, wherein like reference numbers refer to like components throughout the several views, FIG. 1 schematically depicts a hybrid electric vehicle 10 having a first axle 12 connected to a first pair of wheels 14 and a second axle 16 connected to a second pair of wheels 18. In one embodiment, the wheels 14 are front wheels, and the wheels 18 are rear wheels. In FIG. 1, the wheels 14, 18 are shown with tires 19 attached. Each axle 12, 16 has two separate axle portions connected via a respective differential 15, 17 as is readily understood by those skilled in the art. Each wheel 14, 16 has a friction brake mechanism 20, shown as a disc brake. The first axle 12 is connectable to a hybrid electric transmission 22, and the second axle 16 is connectable to an electric drive module 24. The hybrid electric transmission 22, an engine 26, an energy storage device 70, a controller 64, and the electric drive module 24 together establish a hybrid powertrain 27 that provides various operating modes for forward propulsion of the vehicle 10 without creating a drag torque on the second axle 16.

The hybrid electric transmission 22 is connected to the engine 26, which has an output shaft 28 and an engine vibration dampener 30. The transmission 22 includes an input shaft 32, a differential gear set that is a planetary gear set 40, a first final drive 50 that is a gear set, and the axle differential 15. The planetary gear set 40 includes a central sun gear member 42, a carrier member 46 that rotatably supports a plurality of planet gears 47, and a ring gear member 44. The planet gears 47 mesh with both the ring gear member 44 and the sun gear member 42. The first final drive 50 includes a first gear 52 and a second gear 54 that meshes with the first gear 52 and rotates commonly with a component of the differential 15, as is understood by those skilled in the art. The final drive 50 may instead be a chain engaged with rotating sprockets or a combination of mechanical elements instead of meshing gears.

The transmission 22 also includes a first electric machine 60, referred to herein as a motor-generator 60, but that, in some embodiments, can be configured to be operable only as a generator, that is, is not configured to be operated as a motor. In other embodiments, the first electric machine 60 is operable as either a motor or as a generator, in different operating modes. The motor-generator 60 has cables 62 that electrically connect it to an electronic controller 64. The first electric motor-generator 60 includes a rotatable rotor and a stationary stator, arranged with an air gap between the stator and the rotor, as is known. However, for simplicity in the drawings, the first electric motor-generator 60 is represented as a simple box. The controller 64 also includes an integrated rectifier to convert alternating current provided by the first motor-generator 60 to direct current that can be stored in an energy storage device 70, such as a propulsion battery, connected through cables 62 to the controller 64. In some embodiments, those where the motor-generator 60 is operable as a motor, the controller 64 also includes an integrated power inverter for converting direct current from the energy storage device 70 to alternating current for operating the first electric motor-generator 60. The rectifier or the power inverter could instead be a separate component from the controller 64.

The transmission 22 also includes a first brake 66 that is selectively engageable by the controller 64 to connect the ring gear member 44 to a stationary member 65, such as a transmission casing, to hold the ring gear member 44 stationary.

The transmission 22 further includes a rotating clutch 68 that is selectively engageable by the controller 64 to couple the ring gear member 44 for common rotation with the first gear 52 of the first final drive 50. As used herein, "common rotation" means rotation at the same speed. The clutch 68 is concentric with the input shaft 32, but is not connected for common rotation with the input shaft 32. That is the clutch 68 surrounds the input shaft 32 as a sleeve.

The electric drive module 24 includes a second final drive 72 that is a gear set having a first gear 74 and a second gear 76 meshing with the first gear 74 and the axle differential 17, one portion of which rotates commonly with the second gear 76, as is understood by those skilled in the art. The final drive 72, instead of a pair of meshing gears, may be a chain engaged with rotating sprockets or a planetary gear set or a combination of mechanical elements. The electric drive module 24 also includes a second electric machine 80, referred to herein as a second motor-generator 80, which can be operable as a motor to propel the hybrid electric vehicle 10 or as a generator to assist in its propulsion or to provide or to assist in braking The second motor-generator 80 has cables 62 that electrically connect it to the controller 64. The second electric motor-generator 80 includes a rotatable rotor and a stationary stator, arranged with an air gap between the stator and the rotor, as is known. However, for simplicity in the drawings, the second electric motor-generator 80 is represented as a simple box. The controller 64 also includes an integrated power inverter to convert direct current from the energy storage device 70 to alternating current for operating the second electric motor-generator 80 and to convert alternating current from the motor-generator 80 to direct current that can be stored in an energy storage device 70. The second axle 16, like the first axle 12, is actually composed of two shafts, generally referred to as half-shafts, which are connected to gears (not shown) within the respective axle differential 15, 17, as is understood by those skilled in the art. When travelling in a straight line, without wheel slip, the axle differential 15 and the two halves of the axle 12 all rotate as if they were a solid unit, as do the axle differential 17 and the two halves of the axle 16. The common speed of these rotating parts is referred to as the axle speed.

It should be appreciated that, although a single controller 64 is illustrated and described as being operatively connected to both of the motor-generators 60, 80, to the engine 26, to the first brake 66 and to the first clutch 68, multiple different controllers, all configured to communicate with one another, may be dedicated to one or more of these components. In some embodiments, controller 64 may include an integrated power inverter to supply each motor-generator 60, 80 with alternating current at a frequency corresponding to the operating speed of each motor-generator, as is known. Controller 64 may be used to receive electrical power from the first motor-generator 60 and to convey electrical power to the second motor-generator 80.

The planetary gear set 40 in the transmission 22 is used as a differential gear set. That is, each of the three coaxial rotating elements: the sun gear member 42, the carrier member 46, and the ring gear member 44, may be rotating simultaneously, so that the speed of the carrier member 46 is the weighted average of the speeds of the sun gear member 42 and ring gear member 44, weighted by the numbers of teeth on the sun gear member 42 and the ring gear member 44. In FIG. 1, the sun gear member 42 is connected for common rotation with the first motor-generator 60, the planet carrier member 46 is connected for common rotation with the input shaft 32 and thus to the engine output shaft 28, and the ring gear member 44 is connected to one side of the rotating first clutch 68 and is thereby selectively connected to the final drive 50 when the first clutch 68 is engaged.

In the embodiment shown in FIG. 1, the engine 26 is an internal combustion type with cylinders 90 as working chambers of the engine. In this particular embodiment, the engine 26 has four cylinders 90 arranged along the crankshaft 28. As is known, valves may be used to admit air or an air-fuel mixture to each cylinder 90 and to exhaust combustion products from the cylinders 90 as part of exemplary engine operation in a four-stroke cycle of intake stroke, compression stroke, expansion stroke, and exhaust stroke. In some embodiments, the engine 26 may be equipped to selectively operate one or more cylinders 90, such as by selectively opening valves and admitting air or an air-fuel mixture to one or more cylinders 90 while air or combustion products remain trapped in the other cylinders 90 of the engine 26. This may be referred to as cylinder deactivation. The engine 26 may be either a spark-ignition engine or a compression-ignition (i.e. diesel) engine.

Figure 2:
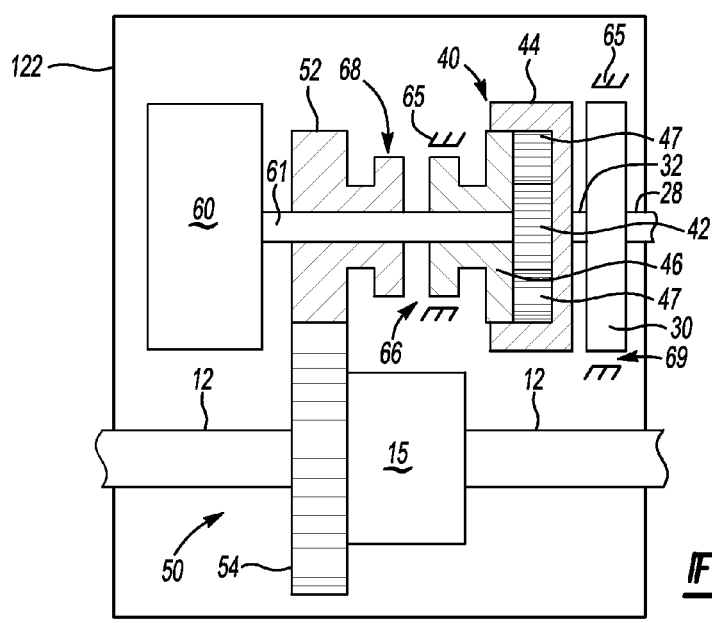
FIG. 2 is a schematic illustration in partial cross-sectional view of an alternative hybrid electric transmission in the hybrid electric powertrain of FIG. 1.

FIG. 2 shows an alternate arrangement of a hybrid electric transmission 122. Specifically, in the hybrid electric transmission 122, the sun gear member 42 of the planetary gear set 40 is connected to the motor-generator 60 as in FIG. 1, via a motor shaft 61, but the ring gear member 44 is connected to the input shaft 32 and thus to the engine 26 through the engine output shaft 28. The planet carrier member 46 is connected to one side of the rotating clutch 68 and is thereby selectively connected to the final drive 50 when the first clutch 68 is engaged. The planet carrier member 46 may also be grounded to the stationary member 65 by engagement of the brake 66. An optional input brake 69 is selectively engageable to ground the input member 32, and thus the engine 26, to the stationary member 65. The optional input brake 69 enables an electric-only, all-wheel-drive operating mode in which the engine 26 is off, and both motor-generators 60 and 80 operate as motors. The optional provision of an input brake 69 and its use for an electric-only all-wheel-drive can also be made in an arrangement that is otherwise as shown in FIG. 1.

If a starter motor 82 is provided to start the engine 26, then the motor-generator 60 need not be used as a motor to start the engine and may be configured to be operable only as a generator. In such an embodiment, an electric-only, all-wheel drive operating mode would not be available, and the optional input brake 69 would not be provided. In an embodiment provided with a dedicated engine starter motor such as starter motor 82, a brake 66 is not necessary for providing reaction torque for using the motor-generator 60 to start the engine 26, and thus the brake 66 need not be provided. Furthermore, in an embodiment provided with a dedicated engine starter, the planetary gear set 40 is not used for starting the engine, and a clutch 68 is not necessary for disconnecting the planetary gear set 40 from the final drive 50, and thus the clutch 68 need not be provided. In all of the embodiments described, the vehicle 10 could be driven by the battery 70 and the second electric machine 80 with the engine 26 stopped by allowing the first electric machine 60 to freewheel.

The arrangements of the transmission 22 and the transmission 122 have a similar function, so that a single, fixed torque ratio through the transmission 22 or 122 is provided and the speed of the engine 26 is mathematically a linear combination of the speed of the first axle 12 and the speed of the motor-generator 60. However, the quantitative speed and torque relationships among the engine 26, the final drive 50, and the motor-generator 60 are different for the different arrangements with the same numbers of teeth on the members of the planetary gear set 40. In particular, as explained herein, the arrangement in FIG. 2 will require more torque from the motor-generator 60 and will require a lower gear ratio in the final drive 50 to produce otherwise similar results.

Figure 3:
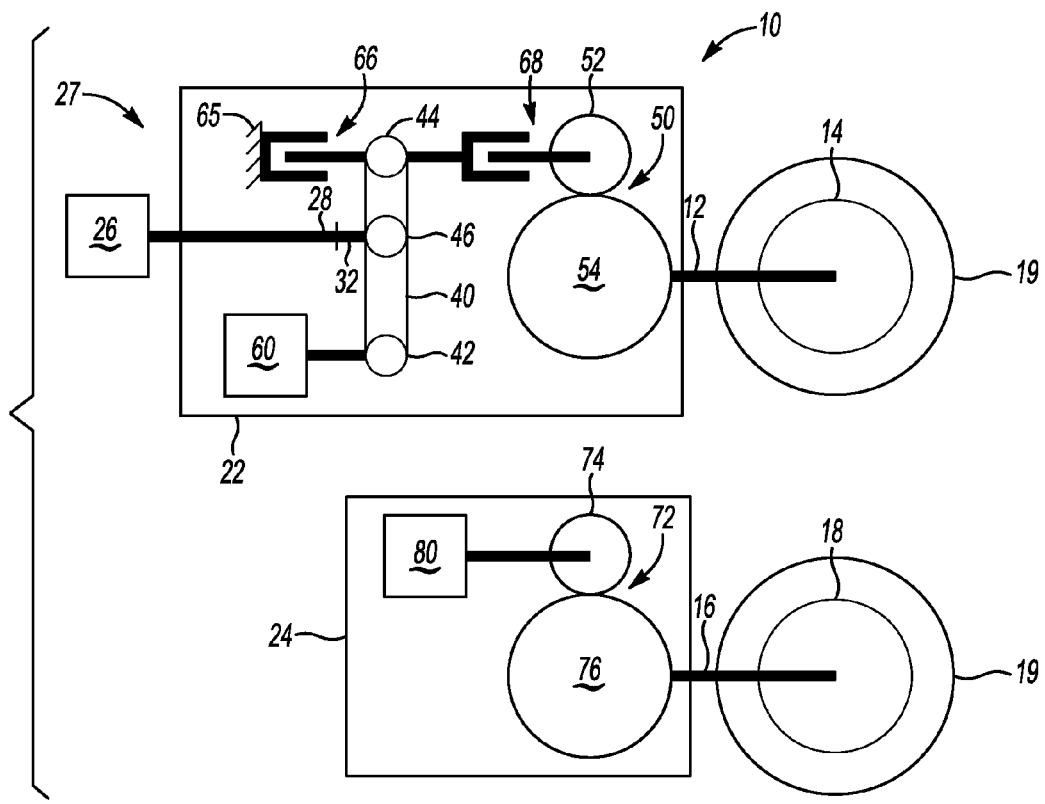
FIG. 3 is a schematic illustration in lever diagram form of the hybrid electric powertrain of FIG. 1 connected to the first axle and the second axle.

FIG. 3 depicts a portion of the hybrid electric powertrain 22 in schematic form, including the hybrid transmission 22 and the electric drive module 24. The transmission 22 is connected to the engine 26 and to the first axle 12. The planetary gear set 40 is depicted as a lever to show the torque and speed relationships among the sun gear member 42, the planet carrier member 46, and the ring gear member 44. The first final drive 50 is depicted as a pair of circles, indicating meshing gears or an arrangement with similar function, to show torque multiplication and speed reduction effected by the final drive 50 from the ring gear member 44 to the first axle 12. The electric drive module 24 is depicted with a pair of circles to show torque multiplication and speed reduction from the motor-generator 80 to the axle 16 through the second final drive 72.

In the embodiment of the hybrid transmission 22 of FIG. 3, the engine 26 is operatively connected to the planet carrier member 46, the motor-generator 60 is operatively connected to the sun gear member 42, and the rotating clutch 68 and brake 66 are operatively connected to the ring gear member 44. If the motor-generator 60 is stationary, meaning that its rotor portion is stationary, and the rotating clutch 68 is engaged, then the speed ratio from the engine 26 to the first axle 12 is equal to the speed of the planet carrier member 46 divided by the speed of the ring gear member 44 and multiplied by the gear ratio of the final drive 50, which is the number of teeth of gear member 54 divided by the number of teeth of the gear member 52. If the ratio of the number of teeth of the ring gear member 44 divided by the number of teeth of the sun gear member 42 is R, then the speed ratio through the planetary gear set 40 in this case is $R/(R+1)$. R is always greater than one, so the speed ratio through the planetary gear set 40 with the sun gear member 42 stationary is always less than one and greater than zero. For a conventional transmission, this would be called "overdrive", since the speed of the output of the planetary gear set 40 (i.e., the ring gear member 44) to the final drive 50 is greater than the speed of the input to the planetary gear set 40 from the engine 26.

The torque ratio of the hybrid transmission 22, that is the torque of the axle 12 over the torque on the input shaft 32, is the same as the speed ratio of the hybrid transmission 22, with the sun gear member 42 stationary. By measurement, the actual torque of the axle 12 will be slightly less than the value indicated by the combination of this torque ratio and the torque from the engine 26 because of unavoidable friction and viscous losses within the hybrid transmission 22. Besides these incidental drag losses, the torque ratio of the hybrid transmission 22, that is the torque of the axle 12 over the torque of input shaft 32, is a constant, that is, a single value, based on the number of teeth of the gears of the planetary gear set 40 and the number of teeth of the gears or ratio of sprockets of the final drive 50. The single constant value also referred to as a single fixed value of the torque ratio is not dependent on the speed of the motor-generator 60. In contrast, the speed ratio of the hybrid transmission 22, that is the speed of the input shaft 32, or the engine output shaft 28, over speed of the axle 12, is continuously variable, based on the speed of the motor-generator 60 and the sun gear member 42.

The combination of the planetary gear ratio and the final drive gear ratio in the transmission 22 may be selected to allow the engine 26 to be operated at a speed at or very near the minimum speed necessary for continuous engine operation without restricting the flow of air or air-fuel mixture into the working chambers of the engine 26 when the vehicle is cruising at a steady speed. As used herein, "the minimum speed necessary for continuous engine operation" is the minimum engine speed at which a predetermined smoothness and consistency in engine output torque for propulsion of the vehicle is achieved. For example, the torque from the damper 30 that is applied to the input shaft 32 in the transmission 22 may be required to remain within 20% of a predetermined level of torque or of an average torque level as the input shaft rotates. This minimum speed is determined by a large number of factors which may include the displacement volume of each cylinder 90, the peak pressure attained in each cylinder 90, the reciprocating inertia of the engine 26, the rotating inertia of the engine 26, and the rotating inertia and the spring stiffness of the damper 30. The output torque of the engine 26 is determined in part by peak pressure attained in each cylinder 90, so this minimum speed may increase somewhat with increasing engine torque. In one non-limiting example, the planetary gear ratio and the final drive gear ratio may be selected so that the engine 26 can be operated at the minimum engine speed for continuous engine operation without throttling with the vehicle cruising at a steady speed. That is, the single torque ratio of torque from the front axle 12 over torque on the input shaft 32 may be selected in the design of the transmission 22 so that the engine 26 may run without throttling over a wide range of steady cruising speeds of the hybrid electric vehicle 10, the lowest speed corresponding to the minimum speed for operating the engine 26 continuously without throttling and with the motor-generator 60 stationary. At speeds above this lowest speed, the engine 26 may also be operating without throttling and supplying torque to the front axle 12 at the same torque ratio, but greater torque on the wheels 14, 16, may be required to drive the vehicle 10, torque which may be supplied by the electric drive module 24 with its motor-generator 80 acting as a motor, as discussed further below.

As used herein, "without throttling" and "unthrottled" mean, in the case of an engine, such as an ordinary spark-ignition engine that uses a throttle for control of its torque output, operation with the throttle in a fully-opened position, also known as "wide-open throttle" operation. A compression-ignition engine does not have a throttle but can use control of the fuel alone to control its torque output. Accordingly, with respect to a compression-ignition engine, the terms "without throttling" and "unthrottled" refer to operation of the compression-ignition engine whether fuel is controlled for maximum torque or any other torque output. The terms "without restriction" and "unrestricted" are herein to be applicable both to operation of a spark-ignition engine without throttling and to operation of a compression-ignition engine with a predetermined maximum amount of fuel that can be burned in the cylinders or other working chambers which are being operated without producing excessive amounts of smoke or other unburned fuel.

Figure 4:
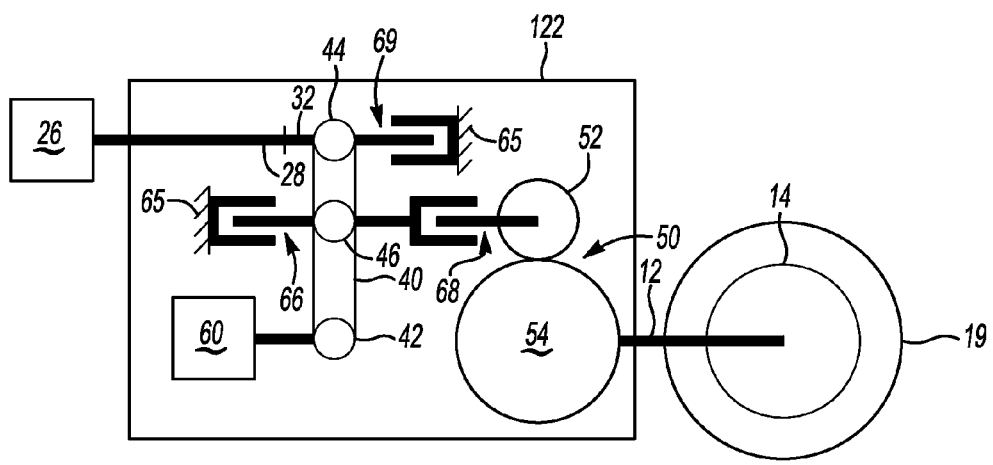
FIG. 4 is a schematic illustration in lever diagram form of the electric transmission unit shown of FIG. 1 with the hybrid electric transmission of FIG. 2.

FIG. 4 shows the hybrid transmission 122 of FIG. 2 in schematic form. The engine 26 is connected to the ring gear member 44, the motor-generator 60 is connected to the sun gear member 42, and the rotating first clutch 68 and the first brake 66 are connected to the planet carrier member 46. If the rotor of the motor-generator 60 is stationary and the rotating first clutch 68 is engaged, then the speed ratio of the transmission 122, i.e., the ratio of the speed of the engine output shaft 28 to the speed of the first axle 12, is equal to the speed of the ring gear member 44 divided by the speed of the planet carrier member 46 multiplied by the gear ratio of the final drive 50, which is the number of teeth of gear member 54 divided by the number of teeth of the gear member 52. If the ratio of the number of teeth on the ring gear member 44 divided by the number of teeth on the sun gear member 42 is R, then the speed ratio through the planetary gear set 40 in the hybrid transmission 122 is (R+1)/R. R is always greater than one, so the speed ratio through the planetary gear set 40 with the sun gear member 42 stationary is always greater than one. The torque ratio of the transmission 122 is a constant value, regardless of the speed of the engine 26, the speed of the motor-generator 60, or the speed of the first axle 12. The torque ratio of the transmission 122 is a constant value equal to the speed ratio of the transmission with the motor-generator 60 stationary. By contrast, the speed ratio of the transmission 122 is not constant, but is instead continuously variable by changing the speed of the motor-generator 60.

In one embodiment, by way of non-limiting example, the combination of the planetary gear ratio and the final drive gear ratio in the transmission 122 may be selected to allow the engine 26 to be operated at a speed at or very near the minimum speed necessary for continuous efficient engine operation, i.e., the minimum speed described above, when the vehicle 10 is cruising at a steady speed. For example, the planetary gear ratio and the final drive gear ratio may be selected so that the engine 26 can be operated at the minimum engine speed for continuous engine operation along the wide open throttle torque curve with the vehicle 10 cruising at a steady speed. As compared with the hybrid transmission 22 in FIG. 3, the gear ratio of the first final drive 50 of the hybrid transmission 122 may be lower and still achieve the same minimum speed for continuous engine operation at the same predetermined engine efficiency.

The combination of the gear ratio of the planetary gear set 40, that is, the relative numbers of teeth on the ring gear member 44 and the sun gear member 42, and the gear ratio of the first final drive 50 in the transmission 22 or 122 has a particular relationship with the engine 26 and the vehicle 10. By way of non-limiting example, these ratios can be selected to allow the engine 26 to operate at wide open throttle with the vehicle cruising at a steady speed throughout a range of engine operating speeds of the engine 26 without requiring the motor-generator 60 to act as a motor during forward propulsion of the vehicle 10 with the engine 26 on. The range of engine operating speeds is from the minimum speed for continuous engine operating to a maximum engine speed, as shown and described with respect to FIG. 5. If the engine 26 is an internal combustion engine with spark-ignition and configured for cylinder deactivation, or if the engine 26 is a compression-ignition engine, such as a diesel engine, operation of some or all of the cylinders 90 of the engine 26 without throttling may be at a lesser torque than the maximum that is available from the engine 26, in order to allow a greater torque ratio through the transmission 22 or 122, as further described below.

Operating the engine 26 without throttling, that is without partially restricting the flow of air or an air-fuel mixture to some or all of those working chambers of the engine 26 that are not deactivated if cylinder deactivation is available, and selecting the transmission torque ratio of the transmission 22 or 122 (i.e., the ratio of the torque of the first axle 12 to the torque of the engine output shaft 28) so that the motor-generator 60 need not be operated as a motor during steady vehicle speed cruising with the engine 26 on may be advantageous. Such a choice of torque ratio eliminates the need to supply power to the motor-generator 60 during cruising, power that would need to come either from the energy storage device 70, and would therefore eventually be exhausted, or from the motor-generator 80 in the electric drive module 24, which would cause the second axle 16 to act in opposition to the forward motion of the vehicle 10. Instead, in the transmission 22 or 122, with the motor-generator 60 always acting either as a generator or simply as a self-powered brake, when the engine 26 is on and providing propulsion power, the motor-generator 80 in the electric drive module 24 can act as a motor to help maintain the motion of the vehicle 10, or can coast (with the rotor of the motor-generator 80 freewheeling) without having any substantial influence on the motion of the vehicle 10. The motor-generator 60 acts as a "self-powered brake" when it is acting as a generator with a very low rotational speed of its rotor, but is neither producing net electrical output or requiring net electrical input, that is, when the motor/generator 60 produces just enough electrical power to prevent its own rotation.

The motor-generator 60 is required to act as a motor only if it is used to start the engine 26, as described below. However, if the motor-generator 60 were not used to start the engine 26, that is, if the engine 26 was equipped with its own starter motor, such as optional starter motor 82 shown in phantom in FIG. 1, then the motor-generator 60 would not need to be equipped to operate as a motor under any vehicle operating conditions, and could in fact be configured to be operable as a generator only. This could allow a simplified construction of the controller 64, because a controller with a set of controlled switches is typically used to operate a contemporary motor-generator as a motor, but an electric machine that is capable only of generation (i.e., a generator rather than a motor-generator) needs only rectifier diodes to convert alternating current into direct current, which may be less costly and complex than to include switches such as power transistors that must actively interrupt the flow of direct current to produce alternating current.

The single fixed torque ratio of the hybrid transmission 22, established by the planetary gear set 40 and the final drive 50, the torque that the engine 26 develops without throttling, and the road load developed by the vehicle 10 as a function of its speed determine the vehicle cruising speed at which the hybrid transmission 22 will drive the vehicle with the electric drive module 24 freewheeling. If this ratio is high, then this speed will be high; if this ratio is low, then this speed will be low. The electric drive module 24 is used in operation of the vehicle 10 as a motor to allow selection of cruising speeds above the cruising speed provided by the hybrid transmission 22 with the electric drive module 24 freewheeling. The torque ratio of the hybrid transmission 22 is chosen in design to be sufficiently low to allow the vehicle 10 to cruise with the engine 26 in continuous operation without throttling and the electric drive module 24 either freewheeling or providing propulsion across a customary range or wide range of vehicle speeds. For example, with only the hybrid transmission 22 driving the vehicle and the engine 26 at wide open throttle, the vehicle 10 may cruise at a low speed (e.g. 40 kph), but with the electric drive module 24 also providing propulsion, the vehicle may cruise several times faster (e.g. 160 kph) as a maximum vehicle speed.

Figure 5:
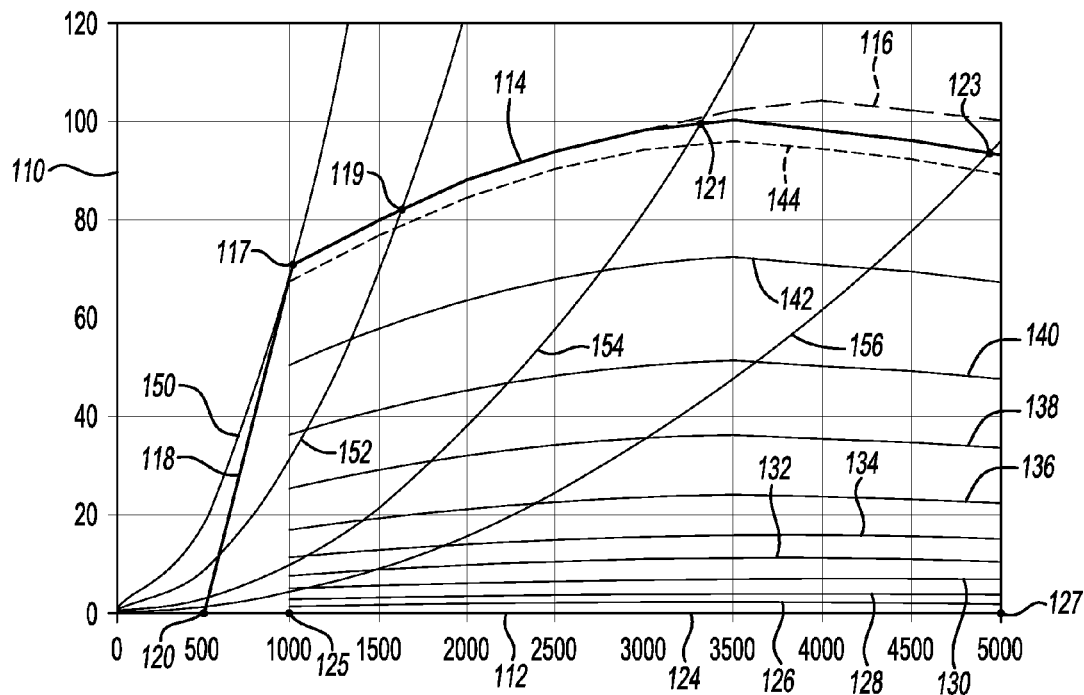
FIG. 5 is a diagram of engine output torque versus engine output speed for a combustion spark-ignition engine at various exemplary torque ratios of front axle torque to engine torque through the transmission, and showing contour lines of different engine efficiencies over a range of engine operating speeds.

FIG. 5 shows engine torque at the engine output shaft 28 on the vertical axis 110, in percentage of maximum output torque without enrichment, versus engine speed in revolutions per minute (rpm) at the engine output shaft 28 on the horizontal axis 112. The upper boundary line 114 of engine output torque is with the engine 26 at wide open throttle (assuming that the engine 26 is a spark-ignition engine, and is running on all cylinders) and a balanced mixture of fuel and air for efficient combustion, except in the region shown by the long-dashed line 116, where enrichment of the mixture with excess fuel allows increased torque at the expense of efficiency. The line 114 of maximum torque available from the engine 26 is generally known as the "torque curve" of the engine 26. The lower boundary in steady output speed of the engine 26 is at the end 117 of the inclined line 118 near the vertical axis and corresponds with a minimum engine speed 125 to provide the torque curve 114 at wide open throttle. Line 118 of the torque curve 114 is the line of minimum engine speeds corresponding with different engine output torques. At engine speeds below the minimum engine speed (i.e., to the left of the line 118), the periodic firing action of the engine 26 results in unacceptably uneven (i.e., unsteady) output speed and torque. Line 118 can be based on tests for a particular engine that establish a predetermined level of steadiness of output speed and torque. Idle speed, shown at point 120, at which the engine 26 produces no torque, is the lowermost limit in acceptable engine operating speed. As engine torque increases, the minimum speed at which the engine 26 must be run to be acceptably smooth also increases. The upper boundary in engine speed to avoid engine damage, the so-called engine "redline" 127, is shown in both FIG. 5 and FIG. 8 as 5000 rpm. The range of engine operating speeds for a given engine torque to provide steady forward propulsion extends from and includes the minimum engine operating speed (a point along line 118) to the maximum engine operating speed (the engine redline 127), inclusive of the minimum and maximum engine operating speeds. In addition, the engine 26 may be rotated by its output shaft by torque applied to it to provide a negative output torque, but this operation is omitted from FIG. 5.

In FIG. 5, contour lines 124, 126, 128, 130, 132, 134, 136, 138, 140, 142 and 144 within the range of engine operating speeds indicate different efficiencies of the engine 26 when operating at various combinations of torque and speed. The contour lines are spaced to reflect engine efficiency increasing by even increments from contour line 124 to contour line 114. In a three-dimensional view, the efficiency contour lines would extend outward from FIG. 5. Accordingly, adjacent groups of lines that are unevenly and closely spaced reflect a relatively distinct increase in efficiency with increasing engine torque in the relevant torque range, while lines that are evenly spaced from one another reflect a relative plateau in engine efficiency with increasing engine torque in the relevant torque range. The contour lines of constant engine efficiency are generally approximately parallel to the engine torque curve 114, because throttling or similar control of the torque has a very strong effect on engine efficiency. The effects of throttling are at first to gradually reduce efficiency as engine operation moves away from wide-open throttle and then to steeply reduce efficiency to zero as output torque decreases to zero, as is indicated by the spacing of the contour lines from 114 to 124. Since engine efficiency is affected by many factors, the actual maximum in efficiency may be reached at curve 144, slightly below the line of torque at wide open throttle (the engine torque curve 114) with a balanced fuel-air mixture and all of the cylinders 90 operating. Such a line of maximum efficiency is exemplified by the short-dashed line of best efficiency 144 immediately below the wide-open throttle torque line 114. This line of best efficiency 144 indicates the engine torque that will result in the best efficiency for each engine speed, and it has a relatively constant value of efficiency as the speed of the engine 26 changes beneath the relatively flat part of the torque curve 114.

Figure 8:
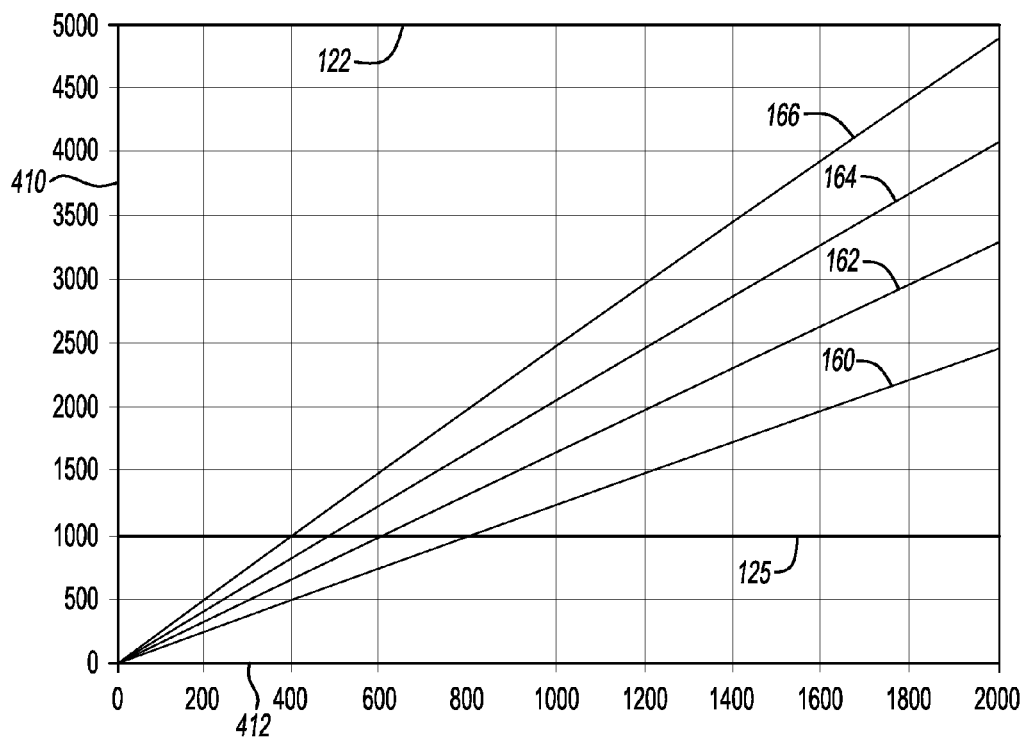
FIG. 8 is an operating diagram of the transmission showing input speed (engine speed) in the vertical direction and output speed (first axle speed) in the horizontal direction.

At a steady speed, on a level surface and without wind, the torque required to drive the wheels 14, 18 varies parabolically with the speed of the wheels 14, 18, as indicated by the four exemplary parabolic lines across FIG. 5, referred to as road load curves 150, 152, 154, 156, which correspond to four different examples of a transmission speed ratio of the speed of the input shaft 32 (or the engine output shaft 28) to the speed of the first axle 12, and an identical transmission torque ratio of the torque of the first axle 12 to the torque of the transmission input shaft 32 (which is the same as the engine output shaft 28). For the exemplary road load curves 150, 152, 154, 156 in FIG. 5, the motor-generator 60 is standing still, so the torque ratio for each curve is identical to the speed ratio for that curve, and the power from the first axle 12 is equal to the power applied to the transmission input member 32, except for small drag losses within the differential gear set 40 and the final drive 50. These example speed ratios are also represented in FIG. 8. FIG. 8 shows the speed in rpm of the engine output shaft 28 (which is the same as the speed of the transmission input member 32) at the vertical axis 410 and the speed of the first axle 12 on the horizontal axis 412. Line 160 is a speed ratio of 1.07 and corresponds with the road load curve 150. Line 162 is a speed ratio of 1.39 and corresponds with the road load curve 152. Line 164 is a speed ratio of 2.09 and corresponds with the road load curve 154. Line 166 is a speed ratio of 2.79 and corresponds with the road load curve 156.

If a first fixed relationship, that is a first fixed speed ratio and the corresponding fixed torque ratio, is established between the first axle 12 and the engine output shaft 28 by the transmission 22 or 122, then the road load appears as a particular one of the parabolic road load curves 150, 152, 154, 156 in FIG. 5. It should be appreciated that the speed ratio of the first axle 12 to the engine output shaft 28 is fixed only if the motor-generator 60 is stationary; the torque ratio of the engine output shaft 28 to the first axle 12 is fixed regardless of the speed of the motor-generator 60. The torque from the engine 26, when operated without throttling, remains relatively constant with the speed of the engine 26, as shown by the torque curve 114, as compared with the road load, so the vehicle 10 may settle at a particular speed (the speed corresponding with an engine speed at point 117, 119, 121 or 123) where the supplied torque is just sufficient to match the torque required from the engine 26 to drive the vehicle 10 at a steady speed (cruising), that is, where the road load curve 150, 152, 154, or 156 and the torque curve 114 intersect. Assuming a fixed speed ratio through the transmission 22 or 122 (e.g., as occurs when the motor-generator 60 is substantially stationary and clutch 68 is engaged), if the vehicle 10 was operating under these conditions and was disturbed slightly, so that its speed fell below the speed corresponding with relevant equilibrium point 117, 119, 121 or 123 (i.e., a speed along the respective road load curve 150, 152, 154 or 156 just below the corresponding point 117, 119, 121 or 123), then the engine torque capability would exceed the road load, as shown by the torque curve 114 being above the road load curve 150, 152, 154 or 156 as the engine speed decreases, and the engine 26 would increase speed toward the equilibrium point 117, 119, 121 or 123. If the vehicle 10 were disturbed to a speed slightly above the speed corresponding with the relevant equilibrium point 117, 119, 121 or 123, then the road load would exceed the engine torque capability, and the engine 26 would decrease speed toward the equilibrium point 117, 119, 121 or 123.

Only four road load curves 150, 152, 154 and 156 representing four different fixed speed ratios between the engine output shaft 28 and the axle 12 and the same torque ratios between the axle 12 and the engine output shaft 28, are shown in FIG. 5. There is actually a continuum of road load curves corresponding with the continuum of fixed speed ratios and corresponding torque ratios that could be established by the design and construction of the planetary gear set 40 and the final drive 50. If a second fixed speed ratio and corresponding torque ratio is established by the transmission 22 or 122 in place of the first fixed speed ratio and corresponding torque ratio, then the road load appears as another one of the particular parabolic curves 150, 152, 154, or 156 in FIG. 5. The vehicle 10 would then settle at a different particular speed without throttling and with the motor-generator 60 stationary. For the second vehicle speed established at the second fixed speed ratio (with motor-generator 60 stationary) and corresponding torque ratio to exceed the first vehicle speed established at the first fixed speed ratio and corresponding torque ratio, the second speed ratio of engine 26 speed over axle 12 speed and corresponding torque ratio of axle 12 torque over engine 26 torque must exceed the first speed ratio and corresponding torque ratio. In general, the hybrid powertrain 27 must provide greater torque to allow the vehicle 10 to go faster. In FIG. 5, for a given engine speed 112, the road load curve associated with a greater fixed speed ratio of the engine output member 28 to the first axle 12 and torque ratio of the first axle 12 to engine output member 28 is below the road load curve associated with a lesser fixed speed ratio of the engine output member 28 to the first axle 12 and torque ratio of the first axle 12 to the engine output member 28. That is, with respect to speed ratio and torque ratio of the transmission 22 or 122, road load curves toward the left of FIG. 5 are at lower speed ratios and torque ratios and road load curves toward the right of FIG. 5 are at higher speed ratios and torque ratios. Because, as discussed above, for a gearing arrangement, speed ratio is substantially equal to torque ratio, road load curves toward the left of FIG. 5 are at lower torque ratios of torque of the first axle 12 to torque of the engine output shaft 28, and road load curves toward the right of FIG. 5 are at higher torque ratios of torque of the first axle 12 to torque of the engine output shaft 28.

For the vehicle 10 to settle at a low steady speed (i.e., for cruising at a low speed) with a fixed speed ratio of speed of the engine output shaft 28 over speed of the first axle 12, and corresponding torque ratio, the fixed speed ratio would need to be relatively low. Since both the fixed speed ratio and the speed of the first axle 12 would be low, the speed of the engine output member 28 would be very low relative to its speed under other conditions and below the speed at which the engine 26 can operate at full throttle, perhaps even below the idle speed 120 of the engine 26. Therefore, a particular vehicle speed exists below which the engine 26 cannot be operated unthrottled to propel the vehicle 10 using a simple transmission operating at any fixed speed ratio. That is, in FIG. 5, the equilibrium point 117 on the road load curve 150 represents the minimum speed at which the engine 26 can operate unthrottled to propel the vehicle without the use of one of the motor-generators 60, 80, and the battery, 70. In FIG. 5, a speed ratio of the engine 26 speed over the first axle 12 speed and corresponding torque ratio substantially below that of the leftmost road load curve 150 would not intercept the range of engine operating speeds at all, indicating that the engine 26 alone could not propel the vehicle 10 in steady state operation (i.e., at a steady vehicle speed) on level ground using a transmission speed ratio below that of the leftmost road load curve 150. Instead, the transmission speed ratio and corresponding torque ratio must be selected so that the resulting road load curve passes through the range of engine operating speeds, that is, with at least a portion of the resulting road load curve passing somewhere through the line 118 of minimum engine speed. Contemporary vehicles with spark-ignition engines typically partially close the throttle of the engine to allow operation below the minimum vehicle speed at which the engine can run at high efficiency. If throttling is used for steady state operation at low vehicle speeds then the efficiency of the engine may suffer significantly, particularly since the engine efficiency falls to zero with the throttle shut. In a hybrid vehicle, such as vehicle 10, the presence of the energy storage device 70 as a reversible energy source allows the possibility of operating the powertrain 27 with the engine 26 intermittently at wide open throttle while charging the energy storage device 70, and with the engine 26 then shut off while discharging the energy storage device 70, while continuously propelling the vehicle 10.

When the engine 26 is operated at or near the low-speed end of the line of best efficiency 144 and the transmission 22 or 122 is operated at the speed ratio at which the motor-generator 60 has zero or near zero rotational speed (i.e., the speed ratio of the speed of the engine output shaft 28 over the speed of the axle 12 with the sun gear member 42 stationary), the vehicle 10 will settle at a particular steady speed (i.e., a cruising speed) on a level road and normal conditions, based on the torque ratio of torque on the first axle 12 over torque from the engine 26 that is established by the differential gear set 40 and final drive 50. At higher vehicle cruising speeds, the powertrain 27 must provide more torque, considering both axles 12 and 16, and the transmission 22 or 122 must provide a higher speed ratio for steady-state operation (i.e., a constant vehicle speed). This requires the motor-generator 60 to operate as a generator, rotating at a speed other than zero and to generate electricity. In FIGS. 1 and 3, the motor-generator 60 rotates forward, at a positive rotational speed, in the same direction as the torque applied to it, to allow a higher transmission speed ratio of the speed of the engine output shaft 28 to the speed of the first axle 12 (and corresponding higher transmission torque ratio of the torque of the first axle 12 over the torque of the engine output shaft 28). In FIGS. 2 and 4, the motor-generator 60 rotates backwards, at a negative rotational speed, but still in the same direction as the torque applied to it, to allow a higher transmission speed ratio of the speed of the engine output shaft 28 to the speed of the first axle 12. The motor-generator 60 will produce electricity, and the controller 64 will direct this electricity through the cables 62 to the motor-generator 80, and control the motor-generator 80 to operate as a motor to apply torque to the axle 14 to help to propel the vehicle 10.

At lower vehicle speeds, the transmission 22 or 122 must also provide a greater speed ratio from the engine output member 28 to the first axle 12 (and corresponding higher transmission torque ratio of the torque of the first axle 12 over the torque of the engine output shaft 28) to keep the engine 26 from operating below its minimum engine speed 118 in the range of engine operating speeds, by similar rotation of the motor-generator 60 acting as a generator. The motor-generator 60 will produce electricity, and the controller 64 will direct this electricity through the cables 62 to the energy storage device 70 and thereby charge the energy storage device 70. At a steady lower speed without incline or wind, the single, fixed torque ratio of the transmission 22 or 122 will require the engine 26 to operate with less output torque. If the engine 26 is a spark-ignition engine that is, not equipped to deactivate some or all of its cylinders 90, this lower torque will require throttling or its equivalent, which will reduce efficiency. If the engine 26 is a spark-ignition engine that is equipped to deactivate some of its cylinders 90, then the remaining cylinders 90 can be operated unthrottled, which will tend to maintain high efficiency. If the engine 26 is a compression-ignition engine, such as a diesel engine, it can operate under these conditions with lower torque output and a lesser reduction of efficiency than a conventional spark-ignition engine, because it is unthrottled.

At a predetermined maximum state of charge of the energy storage device 70, the controller 64 will then shut off the engine 26, disengage the clutch 68, and control the motor-generator 80 to function as a motor, discharging the energy storage device, and propelling the vehicle 10. When the energy storage device 70 reaches a predetermined minimum state of charge, the controller 64 will engage the first brake 66, and control the motor-generator 60 to function as a motor to start the engine 26, and will then release the brake 66 and engage the clutch 68, so that the engine 26 will again propel the vehicle, with the motor-generator 60 again controlled by the controller 64 to function as a generator so that the greater required speed ratio of the transmission 22 or 122 will be provided. That is, during vehicle cruising at low vehicle speeds, the engine 26 will run intermittently. Disengagement of the brake 66 and engagement of the clutch 68 can be synchronous, allowing the brake 68 and clutch 66 to be dog clutches, although they may instead be plate clutches.

Therefore, an operating condition where the motor-generator 60 must be operated as a motor to maintain the correct speed ratio of the speed of the engine output shaft 28 to the speed of the first axle 12 for operation at the predetermined engine efficiency, such as along the best efficiency curve 144, and without the speed of the engine 26 going below its minimum speed in the range of engine operating speeds, is not reached during forward propulsion by the hybrid powertrain 27. So, the motor-generator 80 need never operate as a generator to provide electrical power to the motor-generator 60, and the rear axle 16 will thus never retard the vehicle 10 while it is being driven with forward torque applied at the first axle 12. This condition of opposing torque is associated with a power loop "through the road", because the motor-generator 80 would need to use torque at the axle 14 (i.e., the torque at the wheels 18 provided by the road) impeding the desired motion of the vehicle 10 to supply torque in order to allow the motor-generator 80 to function as a generator. Optionally, the controller 64 could control the motor-generator 80 to function as a generator, creating this condition of opposing torque when the vehicle 10 is going downhill or slowing down, which are situations where a certain amount of retarding torque may be desirable to maintain the speed of the vehicle 10. However, because the powertrain 27 is specifically designed with the planetary gear set 40 arranged as in the transmission 22 or in the alternative transmission 122, and with a particular choice of gear ratios in the planetary gear set 40 and in the first final drive 50, corresponding with steady state operation of the vehicle (i.e., operation at a constant vehicle speed) at a predetermined engine efficiency and over a range of engine operating speeds, the motor-generator 60 need never function as a motor when the engine 26 is operatively connected to and driving the first axle 12, and the motor-generator 80 is thus never controlled to function as a generator.

In an exemplary non-limiting embodiment, the arrangement of the planetary gear set 40, the numbers of teeth on the sun gear member 42, the ring gear member 44, and the planet gears 47, and the ratio of the final drive 50 are chosen in the design of the hybrid transmission 22 or 122, to result in a speed ratio of the speed of the engine output shaft 28 over the speed of the axle 12 of 1.07 with the motor-generator 60 standing still and a torque ratio of the torque on the axle 12 over the torque on the input member 32 of approximately 1.07, ratios which correspond to a road load curve 150 for the vehicle 10. Thus, the vehicle 10 may be propelled by the engine 26 operating unthrottled during cruising conditions corresponding to the road load curve 150 at a speed of the vehicle 10 based upon the speed of the engine 26 at the point where the torque curve 119 meets that road load curve 150 and that speed ratio. Or, because the line of best efficiency 144 is nearby, the vehicle 10 can be propelled by the engine 26 operating continuously and at a predetermined efficiency, that is its maximum efficiency, at this speed of the vehicle 10, and driven by the first axle 12. Below this vehicle speed, the engine 26 can be run intermittently, with the first motor-generator 60 rotating as a generator to increase the speed ratio through the planetary gear set 40 and transmission 22 or 122, the electricity being converted by the controller 64 and stored in the battery 70, the engine 26 operating at its minimum speed 118 and below its unthrottled condition using all of its cylinders 90, and the vehicle being driven by the first axle 12. Above this vehicle speed, the engine 26 can be run continuously and unthrottled, with the first motor-generator 60 rotating as a generator likewise to increase the speed ratio and the electricity being used by the second motor-generator 80, and the vehicle being driven by a combination of the first axle 12 and the second axle 16.

Figure 6:
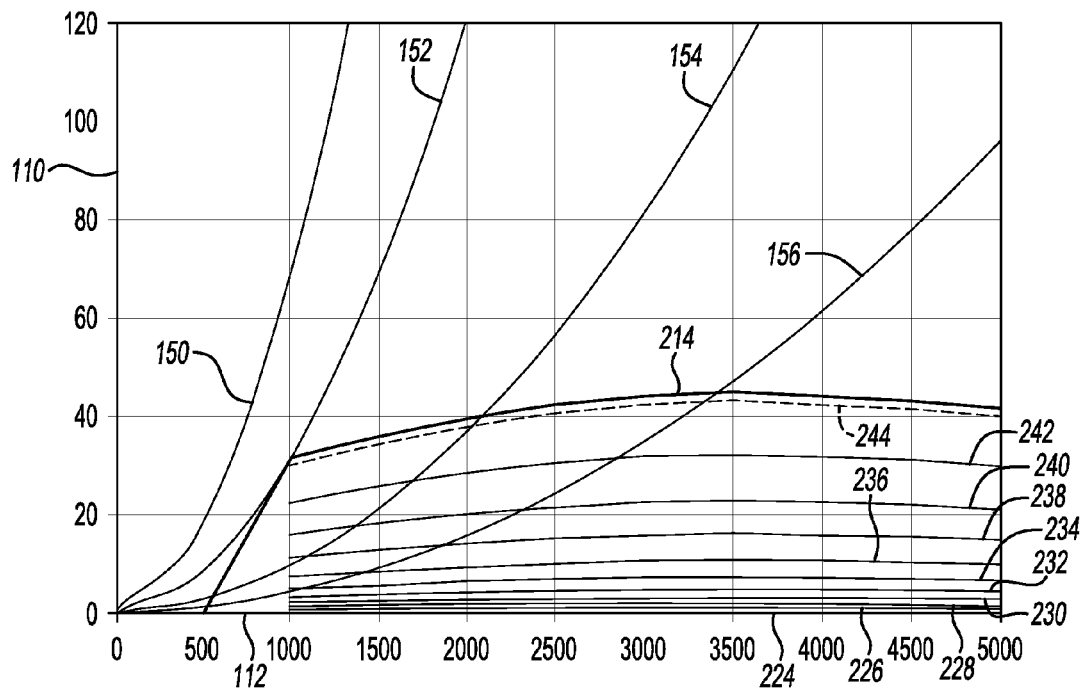
FIG. 6 is a diagram of engine output torque versus engine output speed for the spark-ignition engine of FIG. 5 with selective cylinder deactivation at the exemplary torque ratios of front axle torque to engine torque through the transmission, and showing contour lines of different engine efficiencies over a range of engine operating speeds.

FIG. 6 is an engine operating diagram of the same spark-ignition engine 26 having the engine operating diagram of FIG. 5, assuming that the engine 26 is operable with selective cylinder deactivation and the controller 64 is configured to selectively deactivate some of the engine cylinders 90 of FIG. 1. FIG. 6 is a plot of engine torque at the engine output shaft 28 on the vertical axis 110, in percentage of maximum torque, versus speed of the engine output shaft 28 in revolutions per minute (rpm) on the horizontal axis 112. Engines that have multiple working chambers, such as cylinders or rotors, may be configured so that working fluid may be selectively admitted to some of the chambers but not to others to reduce the torque of the engine without reducing the net expansion ratio of the working fluid proceeding through the engine. Mechanically operating all of the chambers, even those to which working fluid is not being admitted or exhausted, will keep the level of mechanical friction in such an engine substantially the same while reducing its output, which will reduce its efficiency somewhat as compared with operation with all chambers in use at the same net expansion ratio. However, the reduction in efficiency from selectively operating some chambers unthrottled while others are completely shut is less than the reduction in efficiency from throttling all of the working chambers. With an engine equipped to selectively admit working fluid to only some of the working chambers, such as only some of the cylinders 90 of engine 26, the torque ratio of the torque on the first axle 12 over the torque from the engine output shaft 28 and the corresponding speed ratio of the speed of the engine output shaft 28 over the speed of the first axle 12 with the motor-generator 60 stationary can be chosen in the design of the powertrain 27 to allow wide-open throttle operation of the engine 26 on a particular number of cylinders. By way of nonlimiting example, if the engine 26 has four cylinders 90 as shown in FIG. 1, a line 214 of maximum torque available from the engine 26 during cylinder deactivation (shown in FIG. 6) is at a significantly lower torque (roughly half) than the line 114 of FIG. 5 with all cylinders 90 activated. Contour lines of engine efficiency 224, 226, 228, 230, 232, 234, 236, 238, 240, 242, and 244 are also at lower engine torques over the same range of engine operating speeds.

The line 244 of best efficiency with selective operation of only two of the four cylinders 90 at wide open throttle and at the minimum vehicle speed for continuous operation of the engine 26 with maximum operation with only those two cylinders allows the transmission 22 or 122 to be designed with a higher transmission torque ratio (i.e., the torque ratio of the torque of the first axle 12 over the torque of the engine output shaft 28, with the motor-generator 60 at a substantially stationary speed at which it is neither producing nor consuming net electrical power) such as the torque ratio associated with the road load curve 152, than the transmission torque ratio selected for similar predetermined engine efficiency when all cylinders 90 are activated (in which case, for example, the lower transmission torque ratio associated with road load curve 150 is selected) to allow continuous engine operation at steady state over the full range of engine operating speeds (1000 rpm to 5000 rpm).

Figure 7:
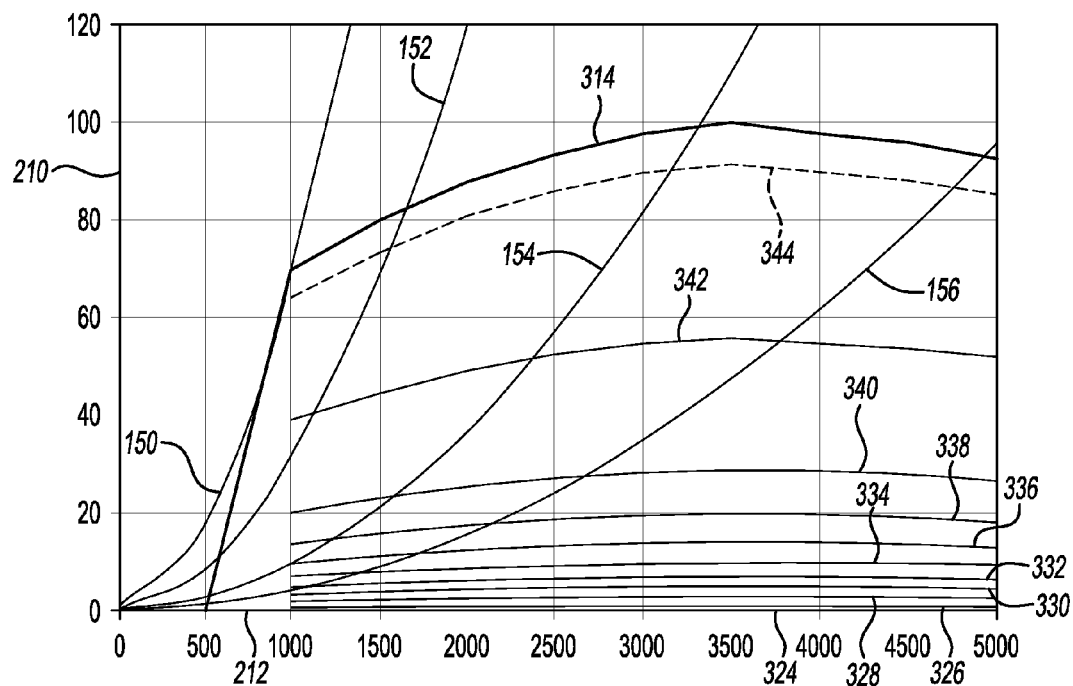
FIG. 7 is a diagram of engine output torque versus engine output speed for a compression-ignition engine at the exemplary torque ratios of front axle torque to engine torque through the transmission, and showing contour lines of different engine efficiencies over a range of engine operating speeds.

FIG. 7 is a plot of engine torque at the engine output shaft 28 on the vertical axis 210, in percentage of maximum output torque, versus engine speed in revolutions per minute (rpm) at the engine output shaft 28 on the horizontal axis 212. FIG. 7 reflects operating characteristics of the engine 26 assuming the engine 26 is a compression-ignition engine, such as a diesel engine. A compression-ignition engine is typically not throttled, and therefore has an engine efficiency map with a relatively constant efficiency across a broad range of engine operating torques, reflected by the efficiency contour lines 324, 326, 328, 330, 332, 334, 336, 338, 340, 342, 344 spaced in relatively even increments near a maximum torque curve 314 and a best torque curve 344, and with rapidly decreasing efficiency near zero torque. The transmission 22 or 122 designed with any given speed ratio of the speed of engine output shaft 28 over the speed of the axle 12 (assuming the motor-generator 60 is stationary) and corresponding torque ratio will encounter less of the inefficient range of operation of the engine 26 in delivering torque across the range of engine operating speeds. For example, road load line 154, reflecting a speed ratio of 2.09, allows more efficient engine performance at steady speed cruising at engine speeds between 1000 rpm and 2500 rpm than does the same speed ratio chosen for a spark-ignition engine, as illustrated by road load line 154 in FIG. 5. A greater transmission speed ratio and corresponding torque ratio may thus be selected when the engine 26 is a diesel engine than when the engine 26 is a spark-ignition engine, without sacrifice of engine efficiency, with the benefit of higher torque available from the engine 26 on the first axle 12, and less need to rely on the motor-generator 80 for providing torque for acceleration and hill climbing.

The configuration of the powertrain 27 enables efficient recovery from wheel slip. Specifically, the controller 64 is configured to receive operating parameters indicative of wheel slip, such as by torque sensors placed on the axles 12, 16. In the event of wheel slip at one of the front wheels 14, reflected as an abrupt reduction of torque at the wheel axle 12, the controller 64 can apply torque to the other of the front wheels 14 by generating a braking command signal to cause an appropriate level of engagement of friction brake mechanism 20 on the slipping one of the front wheels 14. The front motor-generator 60 may provide reaction torque to the planetary gear set 40 to allow the engine 26 to drive the front wheels 14, and act as a generator to supply electrical power to the rear motor-generator 80 for driving the rear wheels. Under those conditions, and if both of the front wheels 14 are slipping, then application of both of the front friction brake mechanism 20 can be used to increase the torque upon the front motor-generator 60 and thereby increase the flow of power to the rear motor-generator 80 and the torque supplied for driving the vehicle 10. Alternatively or in addition, the controller 64 can cause electric power to flow from the energy storage device 70 to the motor-generator 80, and control the motor-generator 80 to function as a motor to thereby apply additional torque at the rear axle 16, aiding in recovery of traction by the vehicle 10. Still further, in addition to the above slip recovery actions, or in the alternative to the above actions, the controller 64 can cause disengagement of the first clutch 68, engagement of the first brake 66, reducing torque of the engine output shaft 28 and increasing its speed, while controlling the motor-generator 60 to function as a generator, sending electric power to the motor-generator 80, which is controlled to function as a motor. In this manner, torque is removed from the slipping wheels 14 and axle 12, and applied to the axle 16.

Similarly, if the controller 64 determines that either or both of wheels 18 are slipping, the controller 64 is configured to undertake slip recovery actions that aid in the recovery of traction of the vehicle 10. For example, the controller 64 can direct electric power generated by the motor-generator 60 to the energy storage device 70, instead of to the motor-generator 80, to lessen torque applied at the wheels 18. Alternatively or in addition, the controller 64 can apply torque to the wheels 14 and/or 18 by generating a braking command signal to cause an appropriate level of engagement of friction brake mechanism 20 on the wheels 14 and/or 18. Torque applied to the wheels 14 and thereby to axle 12 by selective engagement of the friction brake mechanism 20 can prevent slipping of the wheels 14 while momentarily maintaining the torque from the engine 26 and torque on the motor-generator 60 and power output from the motor-generator 60.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A hybrid vehicle having a first axle and a second axle and comprising:
   an engine having at least one working chamber operable for expanding a working fluid;
   an electric transmission that includes
      a differential gear set having a first member, a second member, and a third member; a first final drive; and a first electric machine; wherein the engine is connected for common rotation with the first member, the first electric machine is connected for common rotation with the second member, and the third member is operatively connectable with the first axle through the first final drive;
   an electric drive module that includes a second electric machine operatively connectable to the second axle through a second final drive;
   wherein the differential gear set and the first final drive are configured to establish a single fixed torque ratio of torque of the first axle over torque of the engine;
   wherein the single fixed torque ratio is that at which said at least one working chamber operates without throttling, without torque from the engine exceeding a torque necessary to propel the vehicle at a steady vehicle speed, and with the second electric machine freewheeling.

2. The hybrid vehicle of claim 1, further comprising:
   a first clutch selectively engageable to connect the third member to the first final drive; wherein the differential gear set and the first final drive establish with the first clutch engaged and the first electric machine stationary a fixed speed ratio of the speed of the engine over the speed of the first axle; wherein the engine is operating at a predetermined minimum speed required for steady engine torque at the fixed speed ratio and at the steady vehicle speed.

3. The hybrid vehicle of claim 1, further comprising:
   a first clutch selectively engageable to connect the third member to the first final drive;
   a first brake selectively engageable to ground the third member to a stationary member; and
   an electronic controller operatively connected to the electric machines, the first clutch, the first brake, and the engine;
   wherein the controller is configured to operate the first electric machine as a generator and operate the second electric machine as a motor that uses power provided by the first electric machine, in a two axle-drive, input-split operating mode, with said at least one working chamber operating unthrottled at vehicle speeds above the steady vehicle speed.

4. The hybrid vehicle of claim 1, further comprising:
   a first clutch selectively engageable to connect the third member to the first final drive;
   a first brake selectively engageable to ground the third member to a stationary member;
   an electronic controller operatively connected to the electric machines, the first clutch, the first brake, and the engine;
   an energy storage device;
   wherein, at vehicle speeds below the steady vehicle speed, the controller is configured to switch between: (i) operating the first electric machine as a generator that provides power to the energy storage device or the second electric machine with said at least one working chamber operating unthrottled, and (ii) shutting off the engine and operating the second electric machine as a motor in a second axle-drive, electric-only operating mode.

5. The hybrid vehicle of claim 1, wherein the differential gear set is a simple planetary gear set, the first member is a carrier member, the second member is a sun gear member, and the third member is a ring gear member.

6. The hybrid vehicle of claim 1, wherein the differential gear set is a simple planetary gear set, the first member is a ring gear member, the second member is a sun gear member, and the third member is a carrier member.

7. The hybrid vehicle of claim 1, wherein said at least one working chamber includes multiple working chambers, and further comprising:
   a first clutch selectively engageable to connect the third member to the first final drive;
   a first brake selectively engageable to ground the third member to a stationary member; and
   an electronic controller operatively connected to the electric machines, the first clutch, the first brake, and the engine;
   wherein the controller is configured to switch between selectively operating all of the multiple working chambers and selectively operating only a predetermined number of the multiple working chambers that is less than all of the multiple working chambers; and wherein the single fixed torque ratio is determined based on engine operation with only the predetermined number of the multiple working chambers.

8. The hybrid vehicle of claim 1, wherein the engine is a compression-ignition engine.

9. The hybrid vehicle of claim 1, wherein the engine is a spark-ignition engine operated at wide open throttle.

10. The hybrid vehicle of claim 1, further comprising:
    a first clutch selectively engageable to connect the third member to the first final drive;
    a first brake selectively engageable to ground the third member to a stationary member; and
    an electronic controller operatively connected to the electric machines, the first clutch, the first brake, and the engine;

wherein the controller is configured to selectively engage only the first brake and operate the first electric machine as a motor to start the engine when forward propulsion of the vehicle is provided by the second electric machine operating as a motor in the second axle-drive, electric-only operating mode, the forward propulsion of the vehicle thereby being undisturbed when the engine is started.

11. The hybrid vehicle of claim 1, further comprising:
a first clutch selectively engageable to connect the third member to the first final drive;
a first brake selectively engageable to ground the third member to a stationary member;
an electronic controller operatively connected to the electric machines, the first clutch, the first brake, and the engine;
wherein a first pair of wheels is connected to the first axle; and wherein the controller is configured to (i) determine if either wheel of the first pair of wheels is slipping, and (ii) if either wheel of the first pair of wheels is slipping, cause additional torque to be provided by at least one of:
applying friction brake mechanisms operatively connected to the first pair of wheels;
directing electric power from the energy storage device to the second electric machine and controlling the second electric machine to function as a motor; and
disengaging the first clutch, engaging the first brake, and controlling the first electric machine to function as a generator and the second electric machine to function as a motor receiving electric power from the first electric machine.

12. The hybrid vehicle of clam 1, further comprising:
a first clutch selectively engageable to connect the third member to the first final drive;
a first brake selectively engageable to ground the third member to a stationary member; an electronic controller operatively connected to the electric machines, the first clutch, the first brake, and the engine;
wherein a second pair of wheels is connected to the second axle; wherein the controller is configured to (i) determine if either wheel of the second pair of wheels is slipping, and (ii) if either wheel of the second pair of wheels is slipping, to either or both:
direct electric power generated by the first electric machine to the energy storage device instead of to the second electric machine; and
apply friction brake mechanisms operatively connected to the second pair of wheels.

13. The hybrid vehicle of claim 1, further comprising:
a first clutch selectively engageable to connect the third member to the first final drive;
a first brake selectively engageable to ground the third member to a stationary member; an electronic controller operatively connected to the electric machines, the first clutch, the first brake, and the engine;
an input brake selectively engageable to ground the first member to the stationary member; and
wherein the controller is configured to selectively engage the first clutch and the input brake and operate both the first and the second electric machines as motors to provide an electric-only, all wheel-drive operating mode.

14. The hybrid vehicle of claim 1, further comprising:
an electronic controller operatively connected to the electric machines, the first clutch, the first brake, and the engine; wherein the controller is configured to operate the first electric machine as a generator and to operate the second electric machine as a motor that uses power provided by the first electric machine, in a two axle-drive, input-split operating mode, with said at least one working chamber operating unthrottled at vehicle speeds above the steady vehicle speed;
wherein the controller is configured to switch between: (i) operating the first electric machine as a generator that provides power to the energy storage device or the second electric machine with said at least one working chamber operating unthrottled, and (ii) shutting off the engine and operating the second electric machine as a motor in a second axle-drive, electric-only operating mode; and
a starter motor operatively connected to the engine and to the controller; and wherein the controller is configured to start the engine using the starter motor to shift from the second axle-drive electric-only operating mode to the two-axle drive, input-split operating mode; wherein the first electric machine is configured to be operable only as a generator.

15. A hybrid vehicle having a first axle and a second axle and comprising:
an engine having a plurality of working chambers each operable for expanding a working fluid;
an electric transmission that includes
a differential gear set having a first member, a second member, and a third member; a first final drive; and a first electric machine; wherein the engine is connected for common rotation with the first member, the first electric machine is connected for common rotation with the second member, and the third member is operatively connectable with the first axle through the final drive by selective engagement of a first clutch and is grounded to a stationary member by selective engagement of a first brake;
an electric drive module that includes a second electric machine operatively connectable to the second axle through a second final drive;
an electronic controller operatively connected to the electric machines, the first clutch, the first brake, and the engine;
wherein the controller is configured to switch between selectively operating all of the multiple working chambers and selectively operating only a predetermined number of the multiple working chambers that is less than all of the multiple working chambers;
wherein the differential gear set and the first final drive are configured to establish, when the first clutch engaged, a single fixed torque ratio of torque of the first axle over torque of the engine; wherein the single fixed torque ratio is that at which any one of the working chambers that is operated to expand the working fluid can operate at wide open throttle, without torque of the engine torque exceeding a torque necessary to propel the vehicle at a steady vehicle speed, and with the second electric machine freewheeling;
wherein the differential gear set and the first final drive establish with the first clutch engaged and the first electric machine stationary a fixed speed ratio of the speed of the engine over the speed of the first axle; wherein the engine is operating at a predetermined minimum speed required for steady engine torque at the fixed speed ratio and at the steady vehicle speed; and
wherein the single fixed torque ratio is determined based on engine operation with only the predetermined number of the multiple working chambers.

16. The hybrid vehicle of claim 15, wherein the controller is configured to operate the first electric machine as a generator and operate the second electric machine as a motor that uses power provided by the first electric machine, in a two axle-drive, input-split operating mode, with those ones of the working chambers that are operated operating unthrottled at vehicle speeds above the steady vehicle speed.

17. The hybrid vehicle of claim 15, further comprising:
an input brake selectively engageable to ground the first member to the stationary member; and
wherein the controller is configured to selectively engage the first clutch and the input brake and operate both the first and the second electric machines as motors to provide an electric-only, all-wheel drive operating mode.

18. A hybrid vehicle having a first axle and a second axle and comprising:
an engine;
an electric transmission that includes:
a differential gear set having a first member, a second member, and a third member; a first final drive; and a first electric machine; wherein the engine is connected for common rotation with the first member, the first electric machine is connected for common rotation with the second member, and the third member is operatively connectable with the first axle through the first final drive;
an electric drive module that includes a second electric machine operatively connectable to the second axle through a second final drive;
wherein the electric transmission is configured to establish a fixed torque ratio of torque of the first axle over torque of the engine; wherein the engine operates without throttling and the electric transmission operates at the fixed torque ratio to propel the vehicle at a first steady vehicle speed with the second electric machine freewheeling; and wherein the engine operates without throttling and the electric transmission operates at the fixed torque ratio to propel the vehicle at a second steady vehicle speed with the first electric machine acting as a generator and with the second electric machine acting as a motor to propel the vehicle.

19. The hybrid vehicle of claim 18, wherein the second steady vehicle speed is at least twice the first steady vehicle speed.

20. The hybrid vehicle of claim 18, wherein the first electric machine is configured to be operable only as a generator.

* * * * *